April 1, 1941.　　G. B. SCHOENROCK　　2,237,166

TRAILER HITCH

Filed March 1, 1940　　　2 Sheets-Sheet 1

INVENTOR
George B. Schoenrock.
BY Everett G. Wright
ATTORNEY

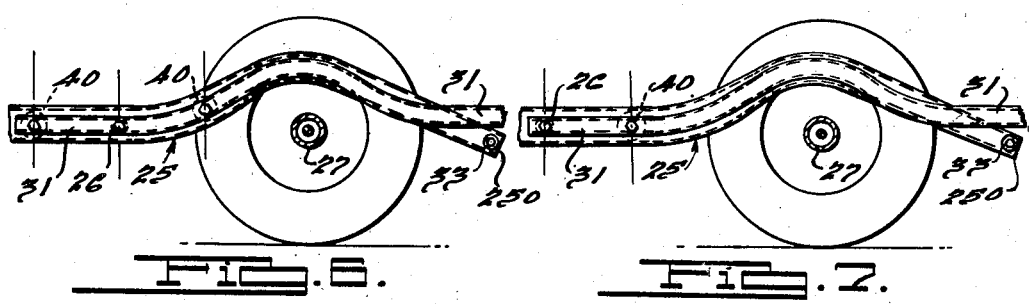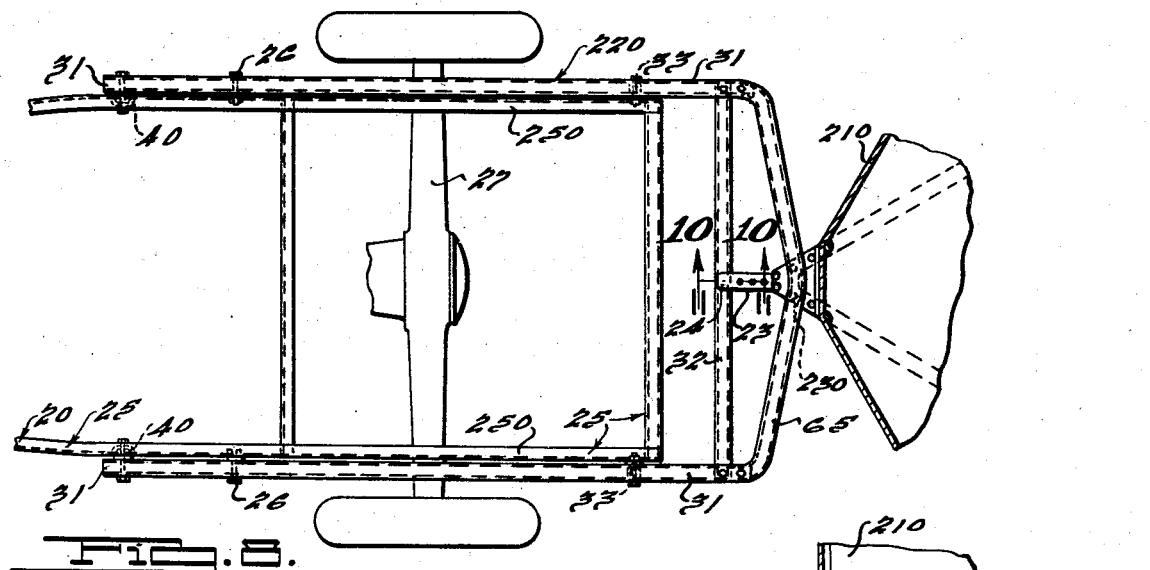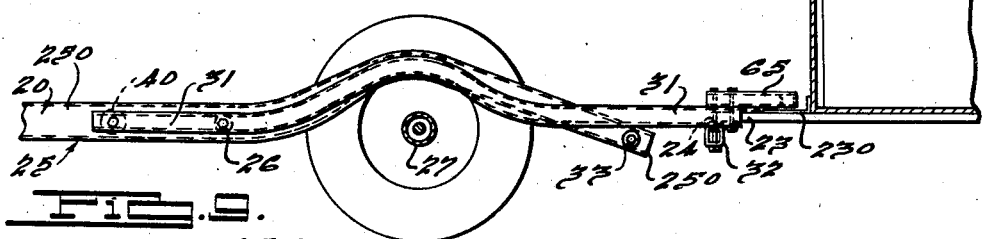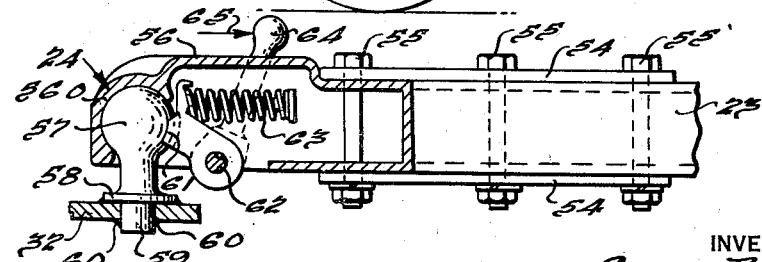

Patented Apr. 1, 1941

2,237,166

UNITED STATES PATENT OFFICE 2,237,166

TRAILER HITCH

George B. Schoenrock, Detroit, Mich.

Application March 1, 1940, Serial No. 321,648

6 Claims. (Cl. 280—33.9)

This invention relates to trailer hitches of the type employed for towing house trailers and light commercial trailers and in particular to trailer hitches which stabilize the riding qualities of both the tow car and the trailer.

The primary object of the invention is to provide a trailer hitch which measurably improves the riding qualities of the tow car-trailer combination by minimizing the vertical whip of the trailer with respect to the tow car and by reducing the spring action or bounce of the rear end of the tow car on its springs when the tow car-trailer combination is driven over rough or bumpy roads at relatively high speeds.

Another object of the invention is to provide a trailer hitch which reduces to a minimum the tendency of the front end of the tow car of a tow car-trailer combination to lift up when going over bumps or dishes in the road.

Another object of the invention is to provide a trailer hitch pivoted vertically at a point forward of the rear axle of the tow car of a tow car-trailer combination including means for stabilizing the vertical pivoting or vertical whip of the trailer and trailer hitch with respect to the tow car.

Another object of the invention is to provide a trailer hitch which distributes the weight of the trailer to all four wheels of the tow car and which dampens out shocks transferred to the frame of the tow car caused by the vertical whip of the trailer with respect to the tow car when the tow car-trailer combination is driven over rough roads.

Still another object of the invention is to provide a trailer hitch which presents a neat appearance and which serves as a bumper support or bumper when a trailer is not coupled thereto.

Other objects of the invention will become apparent by reference to the following detailed description taken in connection with the accompanying drawings, in which:

Figs. 6 and 7 are fragmentary views similar to Fig. 3, each showing an alternate location of the stabilizing and shock absorbing means with respect to the pivotal mounting of the trailer hitch on the frame of the tow car.

Figure 1:
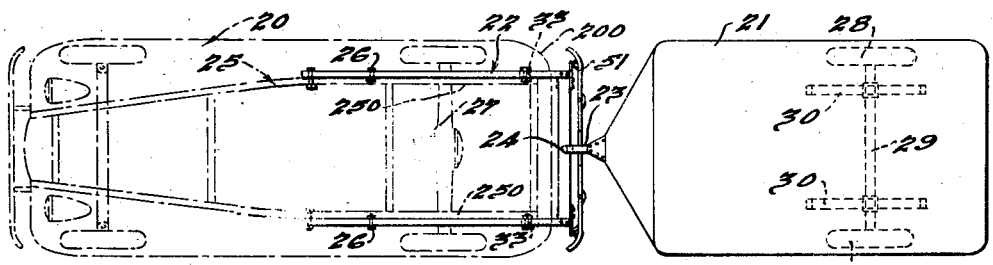
Fig. 1 is a more or less diagrammatic plan view of a tow car and trailer combination employing a trailer hitch embodying the invention as the coupling means therebetween.

Fig. 8 discloses an alternate embodiment of the trailer hitch invention disclosed in Figs. 1 to 7 inclusive preferably employed for commercial trailers or very heavy house trailers.

Fig. 9 is a side elevational view of the construction disclosed in Fig. 8.

Fig. 10 is an enlarged fragmentary view of the ball and socket joint preferably employed to releasably connect the trailer tongue to the trailer hitch in both embodiments of the invention.

Referring now to the drawings wherein like numerals refer to like and corresponding parts throughout the several views, and with particular reference to Figs. 1 to 5 inclusive, a tow car 20 is shown having a trailer 21 coupled thereto by means of a trailer hitch 22 embodying the invention, the tongue member 23 of the trailer 21 being connected to the trailer hitch 22 by a ball and socket joint 24. The said trailer hitch 22 is U-shaped and is vertically pivoted to the main frame 25 of the tow car 20 on horizontally disposed pivots 26 preferably located forward of the rear axle 27 of the said tow car 20.

The tow car 20 may be a passenger automobile, as indicated, or it may be a truck or other type tractor; the trailer 21 being preferably of the type supported on two wheels 28 mounted on a transverse axle 29 suspended by leaf springs 30 below the body of the trailer. The said transverse trailer axle 29 is preferably located to the rear of the center of gravity of the said trailer 21 whereby to provide a normal downward pressure on the trailer hitch 22 at the said ball and socket joint 24 preferably employed between the tongue member 23 of the trailer 21 and the said trailer hitch 22. The employment of a ball and socket joint 24 between the trailer tongue member 23 and the trailer hitch 22 admits of a universal movement between the trailer 21 and the tow car 20 and prevents undue shock on and distortion of the trailer hitch 22 under conditions of heavy impact which occurs when traveling at rather high speeds over relatively rough or bumpy roads.

The U-shaped trailer hitch 22 is preferably composed of two tubular side members 31 formed longitudinally to follow generally the shape of the side members 250 of the main frame 25 of the tow car 20 and a tubular transverse rear member 32 secured across the rear end of the said tubular side members 31 and disposed rearwardly from and in sufficient spaced relationship to the rear transverse frame member 251 of the car 20 to clear the rear end of the body 200 of the said tow car 20. As before mentioned, the said U-shaped trailer hitch 22 is vertically pivoted on the main frame 25 of the tow car 20 on horizontally disposed pivots 26 located at a point forward of the rear axle 27 of the said tow car 20.

Figure 2:
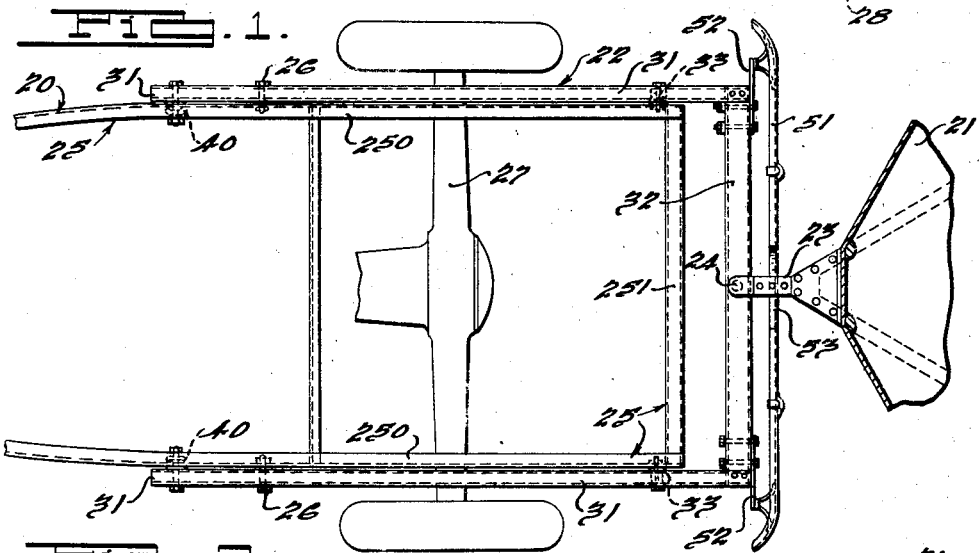
Fig. 2 is an enlarged fragmentary plan view showing in more detail the trailer hitch construction disclosed in Fig. 1.

A suitable stop 33 is secured on the outside of each side frame member 250 of the main frame 25 of the tow car 20 in such a position as to be contacted by the side members 31 of the trailer hitch 22 when the said trailer hitch 22 pivots approximately to the downward limit permitted by the hitch stabilizing means 40 as hereinafter described in detail. Each of the said stops 33 preferably comprise a thimble 34 having a resilient shock absorbing element 35 moulded therearound and are each secured to a main frame side member 250 as indicated in Figs. 2, 3 and 5 directly under and slightly spaced from the normal position of the adjacent tubular side member 31 of the trailer hitch 22 by means of a suitable bolt 36, nut 37 and lock washer 38; the said bolt 36 extending through the main frame side member 250 and the thimble 34 of the said stop 33.

Figure 3:
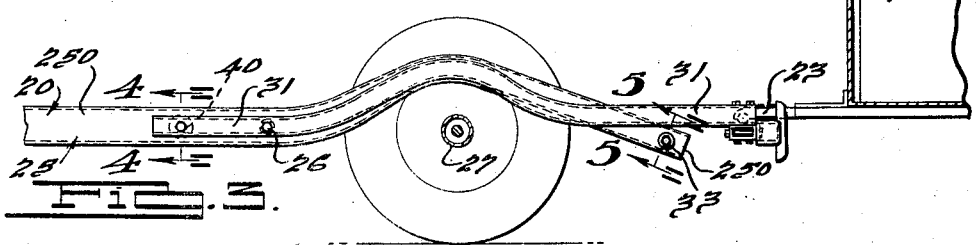
Fig. 3 is a side elevational view of the construction disclosed in Fig. 2.

A trailer hitch stabilizing means 40 is secured to each main frame side member 250 and the tubular side member 31 of the trailer hitch 22 adjacent thereto at a point spaced either rearwardly or forwardly or both rearwardly and forwardly from the horizontally disposed pivots 26 upon which the trailer hitch 22 pivots vertically with respect to the main frame 25 of the tow car 20, see Figs. 3, 6 and 7. The said trailer hitch stabilizing means 40 serves the function of retarding the free vertical pivoting of the trailer hitch 22 with respect to the main frame 25 of the tow car 20 and at the same time holds the said trailer hitch 22 in a normal or neutral position substantially parallel to the main frame 25 of the said tow car 20.

Figures 4, 5:
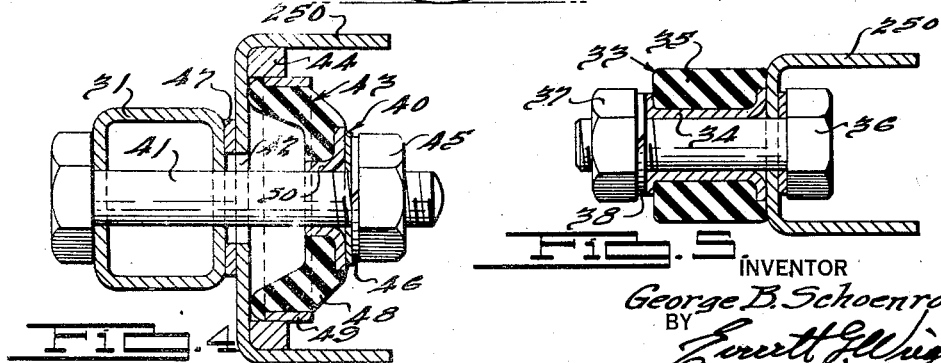
Fig. 4 is an enlarged cross sectional view taken on the line 4—4 of Fig. 3 showing the trailer hitch shock absorbing and stabilizing means preferably employed.
Fig. 5 is an enlarged cross sectional view taken on the line 5—5 of Fig. 3 showing the stop means preferably employed to limit the vertical pivotal movement of the trailer hitch with respect to the frame of the tow car.

As best shown in Fig. 4, each trailer hitch stabilizing means 40 preferably comprises a bolt 41 telescoped with a tight fit transversely through a trailer hitch tubular side member 31 of the trailer hitch 22 at a point longitudinally spaced from the pivot 26 upon which the said tubular side member 31 is pivoted to the adjacent main frame side member 250 and extending through an aperture 42 somewhat larger than the diameter of the bolt 41 provided in the side of the main frame side member 250 and a resilient element 43 held concentric with respect to the said aperture 42 through the main frame side member 250 by a rectangular positioning member 44 wedged in place within the said main frame side member 250 concentric with respect to the said aperture 42 therethrough, the said resilient element 43 being placed under the desired initial compression by tightening a nut 45 threaded on the said bolt 41. A lock washer 46 disposed between the resilient element 43 and the nut 45 prevents loosening of the said nut 45. A spacer washer 47 of suitable thickness and preferably having its central aperture the same diameter as the aperture 42 through the main frame side member 250 is telescoped over the bolt 41 during the installation of the trailer hitch stabilizing means 40 and is positioned between the tubular trailer hitch side member 31 and the adjacent main frame side member 250 to maintain the same in the desired spaced relationship with respect to each other.

The resilient element 43 shown in Fig. 4 comprises a hollow more or less frusto-conical resilient member 48 having a retainer ring 49 around the base thereof which telescopes into the annular center of the rectangular positioning member 44. A heavy grommet 50 through which the bolt 41 of the stabilizing means passes is preferably moulded into the small end of the frusto-conical resilient member 48 of the said resilient element 43. Obviously, the tighter the nut 45 of the stabilizing means 40 is drawn, the less resiliency there is to the resilient element 43 and the less the trailer hitch 22 will pivot about the horizontally disposed pivots 26 when under load from the trailer 21.

There is considerable resiliency to the tubular side members 31 of the trailer hitch 22. If no anchorage or restraining means such as the stabilizing means 40 were employed, the tubular side members 31 would merely pivot freely with respect to the main side frame members 250 of the tow car 20 at the horizontally disposed pivots 26. If the trailer hitch 22 was rigidly secured to the side frame members 250 of the main frame 25 of the tow car 20 at the pivots 26 and at the points where the resilient stabilizing means 40 is employed, see Figs. 3, 6 and 7, then the tubular side members 31 of the trailer hitch 22 would have to absorb by the inherent resiliency thereof all of the impact transferred to it by the vertical whip of the trailer 21 with respect to the tow car 20 when traveling over rough roads at relatively high speeds.

It has been found that it is substantially impossible within practical and economic limits to construct the side members 31 of the trailer hitch 22 sufficiently strong to stand such impact if rigidly secured to the main frame 25 of the tow car 20 at points forward with respect to the rear axle thereof. By employing resilient stabilizing means 40 as hereinbefore described in detail, it has been found that the road shocks from the load of the trailer 21 and the vertical whip therefrom is easily handled by a light economical-to-manufacture and readily installed trailer hitch 22 as herein disclosed, and, at the same time, the dead weight of the trailer 21 is carried forward of the rear axle 27 of the said tow car 20. Thus the weight of the trailer and impact loads therefrom are transferred to all four wheels of the tow car 20. The more forward the pivots 26 are located with respect to the rear axle 27 of the said tow car 20, the more load is carried by the front wheels thereof.

As hereinbefore mentioned, the stops 33 are so located on the main frame 25 of the tow car 20 as to prevent the vertical pivoting of the trailer hitch 22 below the downward limit of pivoting of the trailer hitch 22 about the horizontally disposed pivots as permitted by the resilient stabilizing means 40. Although not shown, like or other types of stop means may be employed to limit the upward pivoting of the trailer hitch 22 as permitted by the resilient stabilizing means 40. The latter is not necessary in the majority of instances because of the fact that the center of gravity of the trailer 21 is forward of its transverse axle 29.

Trailer hitches embodying the invention may have the usual rear bumper 51 secured thereto and supported thereby on suitable brackets 52 as indicated in Fig. 2. In which event, it might be necessary to scallop out the upper central portion 53 of the bumper 51 to permit the tongue member 23 of the trailer 21 to clear the said bumper 51. Because of the neatness and desirable appearance of the trailer hitch 22, and inasmuch as it carries the bumper 51 normally bracketed from the tow car 20, the trailer hitch 22 need not be removed once it is installed on a tow car.

Fig. 10 shows the tongue member 23 of the trailer 21 connected by means of splice plates 54 and bolts 55 to the socket member 56 of the ball and socket joint 24 preferably employed to connect a trailer 21 to a trailer hitch 22 embodying the invention. The ball member 57 of the said ball and socket joint 24 is preferably constructed with a flange 58 and a stem 59 which extends through the top of the tubular transverse rear member 32 of the trailer hitch 22 and is welded thereto as indicated by the numeral 60 in Fig. 10. The socket member 56 is preferably formed at 560 as indicated in the drawings to accommodate the ball member 57 and is provided with a suitable ball retaining member 61 keyed on a transverse shaft 62. A compression spring 63 is employed to constantly urge the said ball retaining member 61 against the said ball member 57. The ball and socket connection between the trailer 21 and the trailer hitch 22 is accomplished by simply placing the socket member 56 on the trailer tongue 23 in registry over the ball member on the trailer hitch 22. The retaining member 61 maintains the ball and socket joint intact until the release lever 64 keyed on the transverse shaft 62 is moved in the direction indicated by the arrow 65 in Fig. 10, whereupon the trailer tongue 23 may be lifted freely from the trailer hitch 22.

The alternate embodiment of the invention designated by the numeral 220 in Figs. 8 and 9 is similar in every respect to the embodiment of the invention disclosed in Figs. 1 to 7 inclusive, except that the rear bumper 51 has been omitted and a transversely disposed whip relief member 65 has been added. The whip relief member 65 is located in spaced relationship to the rear of the tubular transverse rear member 32 of the trailer hitch 220 and sufficiently above the said transverse rear member 32 to permit the tongue member 23 of the trailer 21 connected to the said transverse rear member 32 to pass therebelow, see Fig. 9. The said whip relief member 65 is preferably securely bolted to the top of the rear end of the tubular side members 31 of the trailer hitch 220. A ball and socket joint 24 is preferably employed to accomplish the connection between the tongue member 23 of the trailer 210 and the trailer hitch 220 on the tow car 20, the ball member of the said ball and socket joint 24 being secured to the top of the tubular transverse rear member 32 of the trailer hitch 220.

The trailer hitch 220 disclosed in Figs. 8 and 9 functions similarly to the trailer hitch 22 disclosed in Figs. 1 to 7 inclusive, except that the whip relief member 65 reduces the tendency for the trailer hitch 220 to pivot about its horizontally disposed pivots 26 by establishing a lever action between the trailer 210 and the trailer hitch 220 wherein the end of the tongue member 23 bears on top of the tubular transverse member 32 of the said trailer hitch 220 and the bottom of the whip relief member 65 bears on top of the tongue member 23 at its widened portion 230, all limiting the downward vertical whip of the trailer 210 with respect to the tow car 20 and thereby reducing the impact which the tubular side members 32 of the trailer hitch and the hitch stabilizing means 40 must absorb. It is preferred to use the trailer hitch 220 disclosed in Figs. 8 and 9 where the size, weight and balance of the trailer 21 disclosed in Figs. 1 to 7 inclusive is such that the trailer hitch 22 would become overloaded.

Although but two embodiments of the invention have been disclosed and described in detail, it is to be understood that many modifications as taught herein may be made in the size, shape, arrangement and detail of the various parts thereof without departing from the spirit of the invention, and it is not intended to limit the scope of the invention other than by the terms of the appended claims.

I claim:

1. A trailer hitch comprising a pair of side members formed to follow generally the shape of the frame of a tow car extending rearwardly from said tow car and a transverse member secured thereacross, horizontal pivot means on the frame of said tow car located forward of the rear axle thereof engaging the side members of said trailer hitch pivotally connecting the said trailer hitch to the frame of the tow car, means spaced forwardly and rearwardly from said pivot means engaging the side members of the said trailer hitch and the frame members of the said tow car resiliently supporting said trailer hitch in a substantially horizontal position, and stop means on the frame of the tow car for preventing excessive deflection of the said side members when the trailer hitch pivots downward with respect to the frame of the said tow car, and means for connecting a trailer to said trailer hitch permitting universal movement therebetween.

2. A trailer hitch comprising a pair of side members formed to follow generally the shape of the frame of a tow car extending rearwardly from said tow car and a pair of longitudinally spaced transverse members secured thereacross, the rearmost transverse member being spaced above the other, horizontal pivot means on the frame of said tow car located forward of the rear axle thereof engaging the side members of said trailer hitch pivotally connecting the said trailer hitch to the frame of the tow car, means spaced forwardly and rearwardly from said pivot means engaging the side members of the said trailer hitch and the frame members of the said tow car resiliently supporting said trailer hitch in a substantially horizonal position, and means for connecting a trailer to said trailer hitch permitting universal movement therebetween extending below the said rearmost transverse member and located on top the other.

3. A trailer hitch comprising a pair of side members formed to follow generally the shape of the frame of a tow car extending rearwardly from said tow car and a pair of longitudinally spaced transverse members secured thereacross, the rearmost transverse member being spaced above the other, horizontal pivot means on the frame of said tow car located forward of the rear axle thereof engaging the side members of said trailer hitch pivotally connecting the said trailer hitch to the frame of the tow car, means spaced forwardly and rearwardly from said pivot and means engaging the side members of the said trailer hitch and the frame members of the said tow car resiliently supporting said trailer hitch in a substantially horizontal position, the said means for resiliently supporting said trailer hitch in a substantially horizontal position being adapted to serve as stop means against the frame of the tow car for relieving said resilient means of excessive deflection when the trailer hitch pivots downward with respect to the frame of the said tow car, and means for connecting a trailer to said trailer hitch permitting universal movement therebetween extending below the said rearmost transverse member and located on top the other.

4. A trailer hitch comprising a pair of side members formed to follow generally the shape of the frame of a tow car extending rearwardly from said tow car and a transverse member secured thereacross, horizontal pivot means on the frame of said tow car located forward of the rear axle thereof engaging the side members of said trailer hitch pivotally connecting the said trailer hitch to the frame of the tow car, and means spaced forwardly and rearwardly from said pivot means engaging the side members of the said trailer hitch and the frame members of the said tow car resiliently supporting said trailer hitch in a substantially horizontal position, the said means for resiliently supporting said trailer hitch in a substantially horizontal position being adapted to serve as stop means against the frame of the tow car for relieving said resilient means of excessive deflection when the trailer hitch pivots downward with respect to the frame of the said tow car, and means for connecting a trailer to said trailer hitch permitting universal movement therebetween, the said trailer hitch serving as a permanent bumper support for the rear bumper of said tow car.

5. A trailer hitch comprising a pair of side members formed to follow generally the shape of the frame of a tow car extending rearwardly from said tow car and a transverse member secured thereacross, horizontal pivot means on the frame of said tow car located forward of the rear axle thereof engaging the side members of said trailer hitch pivotally connecting the said trailer hitch to the frame of the tow car, means spaced longitudinally of said pivot means engaging the side members of the said trailer hitch and the frame members of the said tow car resiliently supporting said trailer hitch in a substantially horizontal position, and stop means on the frame of the tow car for preventing excessive deflection of the said side members when the trailer hitch pivots downward with respect to the frame of the said tow car, and means for connecting a trailer to said trailer hitch permitting universal movement therebetween.

6. A trailer hitch comprising a pair of side members formed to follow generally the shape of the frame of a tow car extending rearwardly from said tow car and a transverse member secured thereacross, horizontal pivot means on the frame of said tow car located forward of the rear axle thereof engaging the side members of said trailer hitch pivotally connecting the said trailer hitch to the frame of the tow car, and means spaced longitudinally of said pivot means engaging the side members of the said trailer hitch and the frame members of the said tow car resiliently supporting said trailer hitch in a substantially horizontal position, the said means for resiliently supporting said trailer hitch in a substantially horizontal position being adapted to serve as stop means against the frame of the tow car for relieving said resilient means of excessive deflection when the trailer hitch pivots downward with respect to the frame of the said tow car, and means for connecting a trailer to said trailer hitch permitting universal movement therebetween, the said trailer hitch serving as a permanent bumper support for the rear bumper of said tow car.

GEORGE B. SCHOENROCK.